Dec. 8, 1953  H. V. MILLS  2,661,722
SAFETY CONTROL MECHANISM FOR HYDRAULIC APPARATUS
Filed July 18, 1947  2 Sheets-Sheet 1

INVENTOR.
HOWARD V. MILLS
BY
Herschel C. Omohundro
attorney

Dec. 8, 1953  H. V. MILLS  2,661,722
SAFETY CONTROL MECHANISM FOR HYDRAULIC APPARATUS
Filed July 18, 1947  2 Sheets-Sheet 2
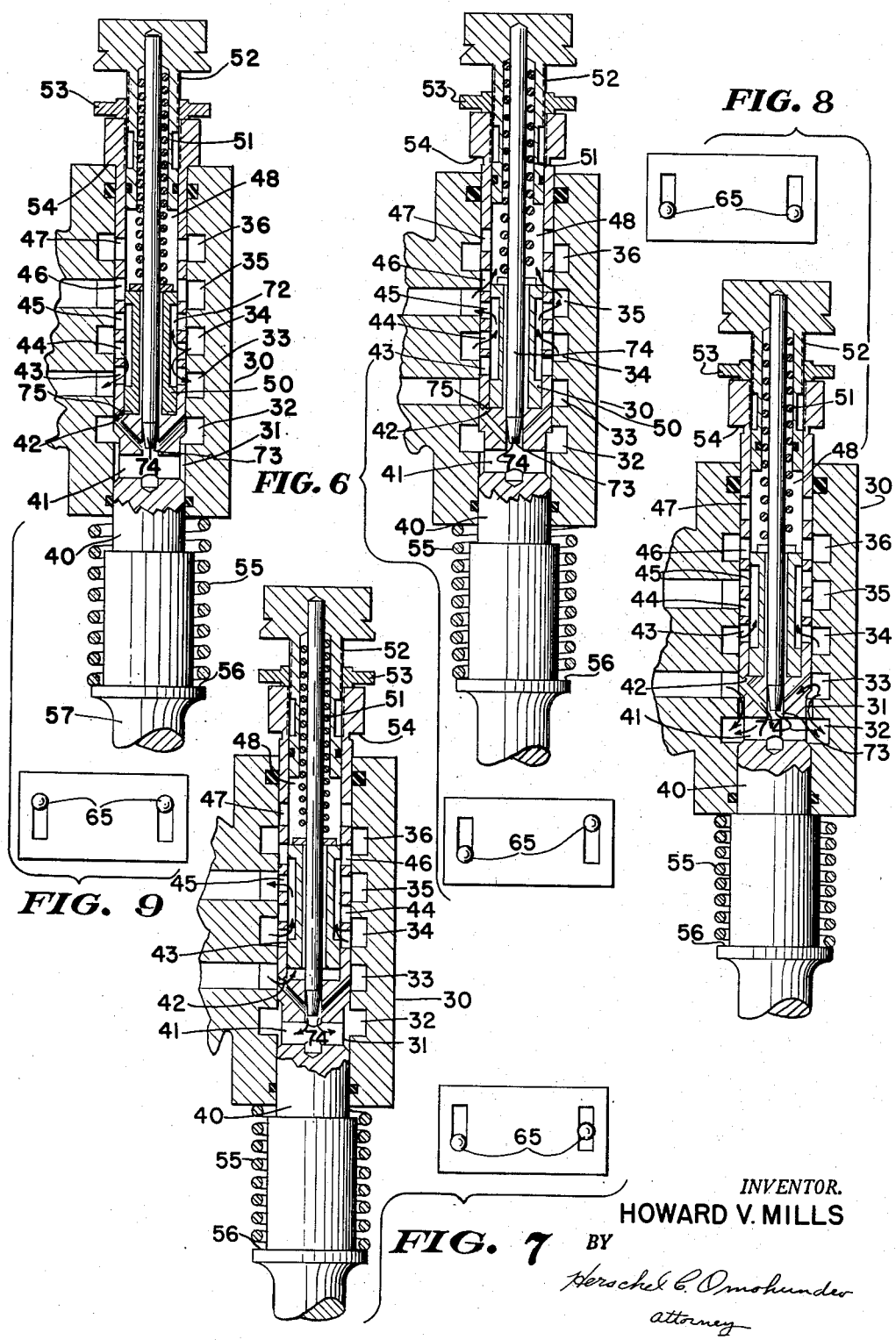
INVENTOR.
HOWARD V. MILLS
BY
Herschel C. Omohundro
attorney

Patented Dec. 8, 1953

2,661,722

UNITED STATES PATENT OFFICE 2,661,722

SAFETY CONTROL MECHANISM FOR HYDRAULIC APPARATUS

Howard V. Mills, Columbus, Ohio, assignor to The Denison Engineering Company, Columbus, Ohio, a corporation of Ohio Application July 18, 1947, Serial No. 761,786

1 Claim. (Cl. 121—38)

This invention relates to control mechanism for machine tools and is particularly directed to apparatus for manually controlling the operation of hydraulic presses.

The invention also relates to improvements in two-hand controls, particularly controls of this character adapted to promote safety in the operation of hydraulic presses.

This application is a continuation-in-part of my copending application Serial No. 567,424, filed December 9, 1944, now Patent No. 2,473,167, issued July 14, 1949.

An object of the invention is to provide a control mechanism for a bench press which will require the operator to use two hands on the control mechanism in the operation of the press thereby reducing the danger of injury to the operator's hands.

An object of the invention also is to provide a control mechanism for a bench press which will cause the bench press to operate in a particular manner, a certain novel lever system being employed in conjunction with a valve having particular characteristics.

A further object of the invention is to provide a control mechanism for a bench press having a pair of pivoted levers connected to a cross-member by universal joints, the cross-member being in turn pivotally connected with a rod which is in turn connected with the movable element of a valve.

A still further object of the invention is to provide a control mechanism for a bench press having a pair of levers mounted for pivotal movement about a common axis, a pair of corresponding ends of the levers being connected for universal movement with a cross-bar which is pivotally connected intermediate its ends with a valve actuating rod, the particular connections permitting movement imparted to one lever only to be transmitted to the other lever without being transmitted to the valve actuating rod, it being necessary to actuate both levers in order to effect the movement of the valve rod and valve.

Another object of the invention is to provide a control system for a bench press having a pair of levers pivoted for rocking movement about the same axis and having a cross-bar connected to a pair of corresponding ends, the intermediate portion of the bar being pivoted on a rod which is connected to the plunger of a control valve, which plunger may be moved to various positions to cause different operations of the press ram, the novel arrangement of levers permitting either lever to be actuated alone without actuation of the valve plunger, the latter being movable through the actuation of both levers in unison or the movement of one lever to and retention in the extreme position of movement coupled with the movement of the other lever the necessary extent to secure the desired action of the press ram.

It is also an object of the invention to provide a control system for a bench press in which a pair of levers are mounted for rocking movement and a pair of corresponding ends of the levers are connected with the movable element of a control valve by a motion transmitting rod and a pivoted cross bar having a universal connection at its ends with the levers the simultaneous depression of the levers or the depression of either while the other is held depressed causing the actuation of the valve, the degree of downward movement of the levers or lever determining the speed of movement of the press ram.

Further objects and advantages of the present invention will be apparent from the following description, reference being had to the accompanying drawings wherein a preferred form of embodiment of the invention is clearly shown.

In the drawings:

Fig. 6 is a vertical sectional view of the control valve of the press showing the valve in the position occupied during idle periods of the press ram, this figure also having a diagrammatic front elevation of the lower portion of the press with the possible positions of the control handles when the valve is in the condition shown indicated thereon;

Fig. 7 is a similar view showing the valve in position to cause controlled downward movement of the press ram the diagrammatic view showing the position of the control handles being disposed at the right of this figure.

Fig. 8 is also a similar view showing the valve and control handles in position to cause full speed movement of the press ram; and Fig. 9 is a vertical sectional view showing the valve and the control handles in position to cause the retraction or upward movement of the press ram.

Figures 1, 2:
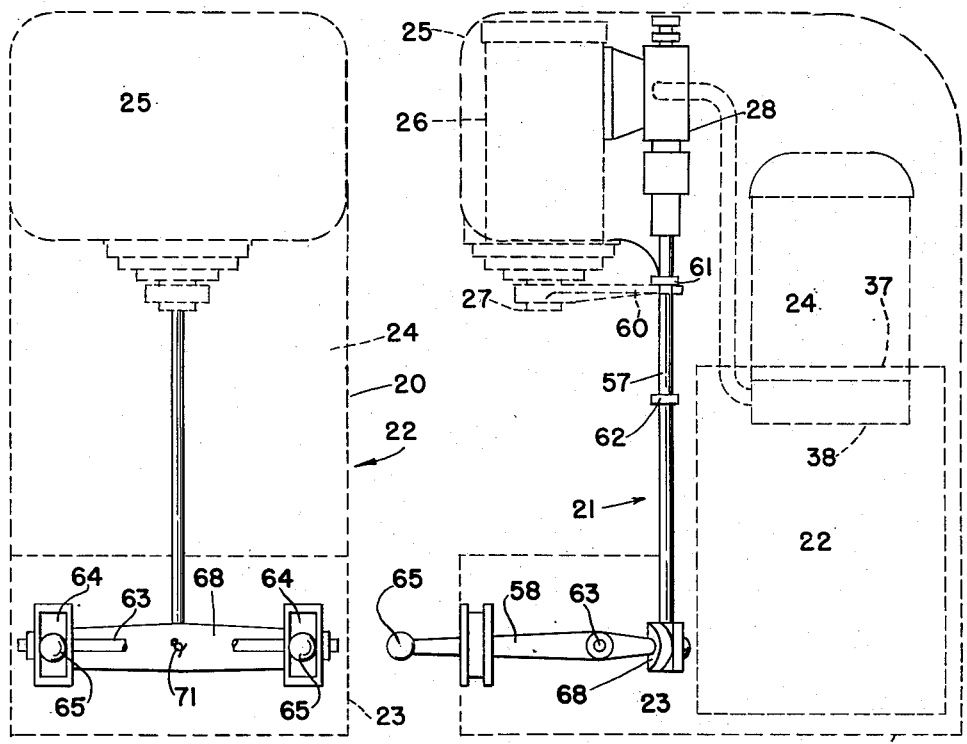
Fig. 1 is a front view, in phantom, of a press provided with a control mechanism formed in accordance with the present invention, parts of the control mechanism being shown in elevation.
Fig. 2 is a side view, in phantom, of the press shown in Fig. 1, the control mechanism being shown in full lines.

Referring more particularly to the drawings, Figs. 1 and 2 show, in phantom, a bench press 20 equipped with a control mechanism 21, indicated generally by the numeral 21, formed in accordance with the present invention. The press 20 includes a frame 22 having a base section 23, an upright back section 24 and a head section 25 which projects over the forward end of the base section. The head section receives and supports a power cylinder 26 which, as usual in devices of this character, is provided with a movable ram 27. The control mechanism 21 is provided to govern the operation of this ram.

Control mechanism 21 includes a valve 28 secured to the back of the power cylinder 26 in the head section, and mechanism, to be later described, for operating the valve. The valve 28 is shown in various operating positions in Figs. 6 to 9, inclusive. This valve includes a body 30 having a bore 31 formed therein. The body also includes a plurality of annular chambers 32 to 36, inclusive, spaced longitudinally of the bore 31, chambers 32 and 36 being connected with a reservoir 37 provided in the press frame 22, chambers 33 and 35 being connected, respectively, with the lower and upper ends of the power cylinder 26 and chamber 34 being connected with a source of fluid pressure such as a motor driven pump 38 indicated by dotted lines in Fig. 2.

Bore 31 slidably receives a plunger valve member 40, which is hollow at its upper portion and is provided with longitudinally spaced ports 41 to 47, inclusive, for registration with the annular chambers in various positions of sliding movement of the plunger. The hollow portion or chamber 48 in plunger 40 slidably receives a spool valve 50 which is normally urged toward the inner end of the chamber 48 by a coil spring 51 engaging the upper end of the spool and a cap 52 adjustably received by the open upper end of the plunger 40. The position of the cap 52 is maintained by a lock nut 53, disposed on the cap for engagement with the end of the plunger. By adjusting cap 52 in or out, the tension of the spring 51 may be varied.

Plunger 40 has an annular shoulder 54 adjacent its upper end for engagement with the top of the body 30 to limit the downward movement of the plunger. Such movement is imparted to the plunger by a coil spring 55 disposed between the bottom wall of the body 30 and a shoulder 56 formed on a rod 57 secured to the lower end of the plunger.

Rod 57 serves to transmit motion from the manually operated levers 58 of the control mechanism 21 to the plunger 40 of the valve. At certain times in the operation of the press, motion may also be imparted from the ram 27 to such plunger. To effect this action, the ram is equipped with a rearwardly projecting arm 60 for engaging a pair of spaced collars 61 and 62 secured to the rod 57.

Figures 3, 4:
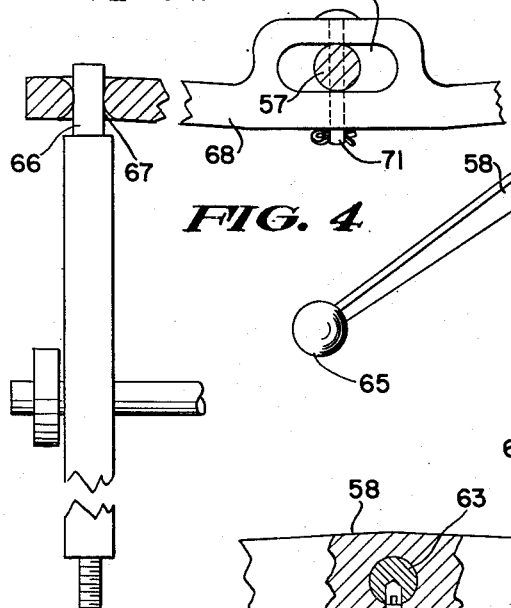
Fig. 3 is a perspective view of the levers and cross-bar of the control system.
Fig. 4 is a fragmentary view of one of the levers and a portion of the cross-bar connecting the levers, the connection between one lever and the cross-bar being shown in section.
Figure 5:
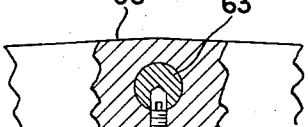
Fig. 5 is a side elevation partly in vertical section of the pivotal connection for one of the levers of the control system.

As shown in Figs. 1 and 3 two levers 58 are employed, these being pivotally supported intermediate their ends on a rod 63 extending transversely of the frame 22. From Fig. 5 it will be seen that the levers 58 are mounted for limited independent pivotal movement on the rod 63 so that they may move a predetermined distance in opposite directions if desired. This movement of the levers, without movement longitudinally of the rod 63, is made possible by forming holes, in the rod, as shown in Fig. 5, to receive the ends of dog point set screws; the holes are larger in diameter than the set screw points so that the levers may pivot without rotating the rod 63. The points in the holes, however, prevent appreciable movement of the levers longitudinally of the rod 63. The levers project forwardly from the rod 63 through openings 64 in the base section of the frame 22, the outer ends of the levers receiving spherical knobs 65. The opposite ends of the levers project rearwardly from the pivot rod 63 and are formed with reduced cylindrical extensions 66 which are received by holes 67 in the end portions of a cross-bar 68 extending between the levers 58. At its central portion, the cross-bar 68 is formed with a slot 70 into which the lower extremity of rod 57 projects. A pin 71 extends through the cross-bar 68 and the rod 57 to pivotally connect these members so that the cross-bar is free to rock in a vertical plane about an axis extending parallel to the planes in which the levers 58 move.

With the lever arrangement just described, the depression of either knob 65 will cause the elevation of the other, the motion being transmitted from one lever to the other by the cross-bar 68 without movement being transmitted to the rod 57. When it is desired to move rod 57 in an upward direction in opposition to the spring 55 both knobs 65 may be depressed at the same time or either moved downwardly while the other is held in a depressed condition. This lever and valve combination provides a highly flexible control system with which more accurate operations of the ram may be secured.

When the press ram 27 is in an idle elevated position, the valve plunger 40 and other parts will be in the positions indicated in Fig. 6. In this position fluid entering chamber 34 from the pressure source will flow through ports 44 to the interior of plunger 40 at the grooved portion 72 of the spool valve 50. This fluid will flow upwardly around the spool and outwardly from the interior of the plunger through ports 45 to chamber 35. When the valve plunger 40 is in the position shown in Fig. 6, chamber 32 is blocked and fluid cannot flow from the lower end of the power cylinder 26. The fluid admitted to chamber 35 will, therefore, flow into the interior of plunger 40 above the spool 50 through ports 46 and outwardly therefrom through ports 47 to chamber 36 and thence to exhaust. The ram will thus be held against undesired downward movement and fluid from the pump will be returned directly to the reservoir without performing any work; the pump will thus operate under minimum load.

To cause a pressing stroke of the ram the valve plunger 40 must be elevated until ports 42 are moved into a position wherein they communicate with chamber 33. Fluid can then flow from the lower end of the power cylinder to chamber 32, through the angular ports 42 to the reduced extension 73 of chamber 48 and to ports 41 which are then in communication with outlet port 32. When fluid is permitted to flow from the lower end of power cylinder in this manner the ram will be moved downwardly by fluid under pressure admitted to the upper end of the power cylinder. The plunger 40 is moved by simultaneously depressing the knobs 65 or depressing one completely and moving the other downward to cause the plunger to move upwardly the desired distance.

The valve 28 has been provided with mechanism for regulating the speed of descent of the ram. This mechanism includes the spool 50, its spring 51 and a valve rod 74 fixed to the cap 52 and extending into the chamber extension 73 to a point adjacent the inner ends of the ports 42. This valve rod 74 may be adjusted inwardly until the flow of fluid from ports 42 to ports 41 is restricted sufficiently to increase the pressure in ports 42. This increased pressure is transmitted through a lateral port 75 to the chamber 48 at the inner end of the spool 50 where it will act on such spool and move the same in opposition to the spring 51. When the spool is elevated in this manner the grooved portion 72 will communicate with ports 46 and part of the fluid admitted from the pressure source will be by-passed directly to exhaust without performing any work. By so by-passing part of the supply, the fluid available for causing ram motion will be reduced and the ram will, therefore, move at a slower rate. It should, of course, be obvious that by a careful positioning of the plunger to limit the degree of communication between chamber 32 and ports 42 plus a proper adjustment of valve rod 74 any desired speed of ram movement may be secured.

In some instances, it may be desirable to have the press ram move rapidly through a portion of its stroke and then slower for the remainder. To secure this type of operation, valve plunger 40 has an external groove 76 formed therein immediately below the angular ports 42. By fully depressing both knobs 65 the plunger 40 may be elevated until groove 76 establishes substantially unrestricted communication between chambers 33 and 32. At this time there will be very little restriction to exhaust flow from the power cylinder and substantially no back pressure to cause the elevation of the spool valve 50. All the fluid flowing from the pressure source to chamber 34 will thus be available to effect the operation of the ram and since there is no restriction to exhaust flow, the ram will move rapidly and without effort. This fast movement is employed when the ram is moved toward the work. Just prior to the engagement of the ram with the work, the control handles may be raised slightly to permit the valve plunger 40 to move downwardly until groove 76 no longer registers with chamber 33 at which time all the exhaust flow from the power cylinder must pass through angular ports 42. The flow control character of the valve will then be utilized to govern the speed of the ram. This downward movement of the valve plunger may be effected either by raising both control handles slightly or by holding either depressed and raising the other. In this manner a finer degree of control may be secured because of the double lever construction and the lever multiplication secured thereby. It will be noted from Fig. 1 that the connection between the cross-bar 68 and the rod 57 is disposed halfway between the connections of the cross-bar 68 with the levers 58. This arrangement provides a two to one leverage on the cross-bar. It will also be noted from Fig. 2 that the length of the portions of levers 58 in front of the pivot 63 are approximately three times as great as the rear portions of the levers. A six-to-one ratio is thus secured which permits the valve plunger to be moved minute distances with rather extensive movements of the control levers. Exact control action is, therefore, made available. It is also possible, by moving both control levers simultaneously, to reduce the ratio from six-to-one to three-to-one when it is desired or necessary to move the valve plunger quickly. Such movement may be required when the valve plunger is moved in a downward direction to cause the elevation or return stroke of the ram.

This downward movement of the valve plunger may be secured by manually elevating the control levers or by merely releasing them to permit the expansion of spring 55. It will also result if the ram is permitted to descend until the arm 60 engages the lower stop collar 62 and pulls the valve plunger down. In its lowered position, plunger 40 and the spool valve therein will establish communication between inlet chamber 34 and chamber 33 which is connected with the lower end of the power cylinder; these elements will also establish communication between the chamber 35 connected with the upper end of the power cylinder and outlet chamber 36 so that the pressure fluid will force the ram in an upward direction.

As the ram approaches the upper end of its return stroke the arm 60 will engage collar 61 and move the valve plunger 40 up to the position shown in Fig. 6 wherein pressure fluid can no longer flow to the lower end of the power cylinder but is directed to exhaust. The ram will then stop and be held in an elevated position ready for a subsequent cycle.

It will be apparent from the foregoing description that the valve 28 is a four-way valve in combination with a flow-control mechanism and when combined with the two hand control lever means 21 a flexible control mechanism is provided which will give the operator the most accurate control possible over the press ram. It will also be apparent that with the control mechanism illustrated the press may be operated with complete safety because both of the operator's hands are occupied on the control levers and are thus safely removed from the ram.

While the form of embodiment of the present invention as herein disclosed constitutes a preferred form, it is to be understood that other forms might be adopted, all coming within the scope of the claim which follows.

What is claimed is:

In a hydraulic press of the type having a source of fluid pressure and a power cylinder with a ram; mechanism for controlling the operation of said ram comprising a valve casing having an inlet port communicating with said pressure source, cylinder ports communicating with the ends of said power cylinder, and exhaust ports; a valve spool disposed for movement in said casing between two extreme positions, said spool in one of said positions establishing substantially unrestricted communication between said pressure source and the first end of said cylinder and between the second end of said cylinder and exhaust to cause rapid movement of said ram in one direction, the other extreme position of said spool establishing communication between the second end of said cylinder and said pressure source and between the first end and exhaust; an intermediate position of said spool establishing communication between said first end of said cylinder and said inlet and restricted communication between said second cylinder port and said exhaust to cause a back pressure; a second spool in said first-mentioned valve spool responsive to such back pressure to establish restricted communication between said inlet port and an exhaust port to reduce the rate of movement of said ram; actuating means for said first mentioned valve spool having a pair of levers pivoted intermediate their ends for movement in planes parallel to the direction of movement of said ram; a crossbar extending between and universally connected with corresponding ends of said levers; resilient means tending to simultaneously move said levers toward one end of their travel and said valve spool to a position to connect a predetermined cylinder port with said pressure source and the other cylinder port with exhaust; and a push rod pivotally connected at one end to the intermediate portion of said crossbar and at the opposite end to said first mentioned valve spool, simultaneous movement of said levers to a predetermined end of their travel serving to position said first valve spool in the first mentioned extreme position, movement of either lever away from such predetermined end while the position of the first is maintained serving to dispose said first-mentioned spool in said intermediate position.

HOWARD V. MILLS.

References Cited in the file of this patent

UNITED STATES PATENTS

| Number | Name | Date |
|---|---|---|
| 1,587,078 | McDermott | June 1, 1926 |
| 1,630,816 | Wilcox | May 31, 1927 |
| 1,917,124 | Jack | July 4, 1933 |
| 1,991,598 | Davis | Feb. 19, 1935 |
| 2,109,162 | Boehle | Feb. 22, 1938 |
| 2,171,570 | Johnson | Sept. 5, 1939 |
| 2,470,086 | Adams | May 17, 1949 |
| 2,473,167 | Mills | June 14, 1949 |

FOREIGN PATENTS

| Number | Country | Date |
|---|---|---|
| 851,144 | France | Jan. 3, 1940 |